United States Patent
Cohen

(10) Patent No.: US 10,962,984 B2
(45) Date of Patent: Mar. 30, 2021

(54) SENSOR-AGNOSTIC DETECTION USING HIGH-LEVEL FEATURE EXTRACTION

(71) Applicant: Toyota Research Institute, Inc., Los Altos, CA (US)

(72) Inventor: Schuyler H. Cohen, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 136 days.

(21) Appl. No.: 16/196,635

(22) Filed: Nov. 20, 2018

(65) Prior Publication Data
US 2020/0159247 A1 May 21, 2020

(51) Int. Cl.
G05D 1/02 (2020.01)
G05D 1/00 (2006.01)
G06K 9/00 (2006.01)

(52) U.S. Cl.
CPC ......... G05D 1/0274 (2013.01); G05D 1/0044 (2013.01); G05D 1/024 (2013.01); G05D 1/0248 (2013.01); G06K 9/00718 (2013.01)

(58) Field of Classification Search
CPC .... G05D 1/0274; G05D 1/024; G05D 1/0248; G05D 1/0044; G06K 9/00718; G06K 9/00805; G01C 21/005; B60W 60/00
See application file for complete search history.

(56) References Cited

U.S. PATENT DOCUMENTS

| | | | |
|---|---|---|---|
| 8,483,881 B2 | 7/2013 | Ermakov et al. | |
| 8,949,016 B1* | 2/2015 | Ferguson | B60W 30/00 340/436 |
| 2016/0082597 A1 | 3/2016 | Gorshechnikov et al. | |
| 2016/0209846 A1 | 7/2016 | Eustice et al. | |
| 2020/0111011 A1* | 4/2020 | Viswanathan | G05D 1/0088 |

OTHER PUBLICATIONS

Caselitz et al., "Monocular Camera Localization in 3D LiDAR Maps", (6 pages).
Guo et al., "Feature-Based Localization Methods for Autonomous Vehicles", dated Nov. 4, 2017, (129 pages).
(Continued)

*Primary Examiner* — Brian P Sweeney
(74) *Attorney, Agent, or Firm* — Christopher G. Darrow; Darrow Mustafa PC

(57) ABSTRACT

The systems and methods described herein disclose detecting objects in a vehicular environment using extracted high level features. As described here, a survey vehicle detects objects in the environment with a survey sensor. Vehicles can then use the extracted features from the survey sensor data to compare with extracted features from input sensor data. Thus, vehicles can benefit from different sensor data without employing said sensor. The systems and methods can include extracting one or more survey features from a survey data set, which can then be mapped to a feature-based map of an environment. An input data set can then be collected using an input sensor type with one or more input features being extracted from the input data set. The one or more input features can then be correlated to the one or more survey features to identify an object in the environment.

20 Claims, 7 Drawing Sheets

(56) References Cited

OTHER PUBLICATIONS

Ukil et al., "IoT Data Compression: Sensor-Agnostic Approach", IEEE Conference Publication, dated Apr. 7-9, 2015, (2 pages).
Vivacqua et al., "A Low Cost Sensors Approach for Accurate Vehicle Localization and Autonomous Driving Application", Molecular Diversity Preservation International and Multidisciplinary Digital Publishing Institute, published Oct. 16, 2017, (33 pages).
Wolcott et al., "Visual Localization within LIDAR Maps for Automated Urban Driving", (8 pages).

* cited by examiner

SENSOR-AGNOSTIC DETECTION USING HIGH-LEVEL FEATURE EXTRACTION

TECHNICAL FIELD

Embodiments described herein generally relate to detection using multiple sensors. More specifically, the embodiments generally relate to systems and methods of sensor-agnostic detection of objects in an environment.

BACKGROUND

Operation of a vehicle is part of everyday life in modern society. As such, drivers and autonomous vehicles can benefit from being aware of changes which occur to the roads. Information regarding objects in an environment can be used for navigation of a vehicle, mapping, and other actions to allow an operator or an autonomous vehicle to navigate the said environment. Vehicles can use a plurality of sensors, varying in quality, cost, and capabilities, in detecting objects in a vehicular environment. Said sensor data can be compared to sensor data collected by the same sensor type in the determination of object detection in the environment.

SUMMARY

The systems and methods described herein include the production of high-level extractions for features or objects. The high-level extractions can be used to allow a variety of sensors to use the same recognition event for comparison of objects or features, regardless of the initial sensor type or the final sensor type. In one embodiment, a sensor-agnostic detection system for object recognition in a vehicular environment is disclosed. The sensor-agnostic detection system can include one or more processors, and a memory communicably coupled to the one or more processors. The memory can store a mapping module including instructions that when executed by the one or more processors cause the one or more processors to extract one or more survey features from a survey data set, the survey data set collected from a survey sensor type, and to map the one or more survey features to a feature-based map of a vehicular environment. The memory can further store a collection module including instructions that when executed by the one or more processors cause the one or more processors to collect an input data set using an input sensor type, the input sensor type being different from the survey sensor type, and extract one or more input features from the input data set. The memory can further store an identification module including instructions that when executed by the one or more processors cause the one or more processors to correlate the one or more input features to the one or more survey features, and to identify an object in the feature-based map as related to the input data set from the vehicular environment.

In another embodiment, a non-transitory computer-readable medium for object recognition in a vehicular environment is disclosed. The non-transitory computer-readable medium can store instructions that when executed by one or more processors cause the one or more processors to extract one or more survey features from a survey data set, the survey data set collected from a survey sensor type. The non-transitory computer-readable medium can further store instructions to map the one or more survey features to a feature-based map of a vehicular environment. The non-transitory computer-readable medium can further store instructions to collect an input data set using an input sensor type, the input sensor type being different from the survey sensor type. The non-transitory computer-readable medium can further store instructions to extract one or more input features from the input data set. The non-transitory computer-readable medium can further store instructions to correlate the one or more input features to the one or more survey features. The non-transitory computer-readable medium can further store instructions to identify an object in the feature-based map as related to the input data set from the vehicular environment.

In another embodiment, a method for object recognition in a vehicular environment is disclosed. The method can include extracting one or more survey features from a survey data set, the survey data set collected from a survey sensor type. The method can further include mapping the one or more survey features to a feature-based map of a vehicular environment. The method can further include collecting an input data set using an input sensor type, the input sensor type being different from the survey sensor type. The method can further include extracting one or more input features from the input data set. The method can further include correlating the one or more input features to the one or more survey features. The method can further include identifying an object in the feature-based map as related to the input data set from the vehicular environment.

Embodiments of the present application can be more clearly understood with relation to the figures and the description below.

BRIEF DESCRIPTION OF THE DRAWINGS

So that the manner in which the above-recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the figures. Additionally, elements of one embodiment may be advantageously adapted for utilization in other embodiments described herein.

DETAILED DESCRIPTION

Systems and methods described herein use high-level extractions from sensor data from a survey sensor type to produce a sensor-agnostic feature-based map. The sensor-agnostic feature-based map can then be applied to sensor data collected from one or more input sensor types to determine object location and vehicle location in the vehicular environment based on the sensor-agnostic map. The systems and methods disclosed herein describe acquiring sensor data about the world using a survey sensor type. Features are then extracted from the sensor data from the survey sensor type to generate high-level extractions for a feature-based map or database of features. The high-level extractions may be stored within the map in a form that is sensor-agnostic (e.g., an intermediate description that does not require particularities of the sensor data).

The feature-based map can then be implemented within a vehicle that has the one or more input sensor types which can include the survey sensor type to perform feature estimation and localization. The vehicle detects the objects and features from the input sensor type and matches the detected data against the high-level extractions stored in the map in order to localize the vehicle. Thus, the data from the input sensor type is compared to data from a survey sensor type when localizing the vehicle. In one or more embodiments, the feature detection and matching can be implemented using a machine learning approach, a hand-tuning approach, or another suitable mechanism. Moreover, a variety of examples of sensors, such as LiDAR and cameras, may be used since the idea relates to cross-sensor compatibility. Embodiments of the present application can be more clearly understood with relation to the figures and the description below.

Figure 1:
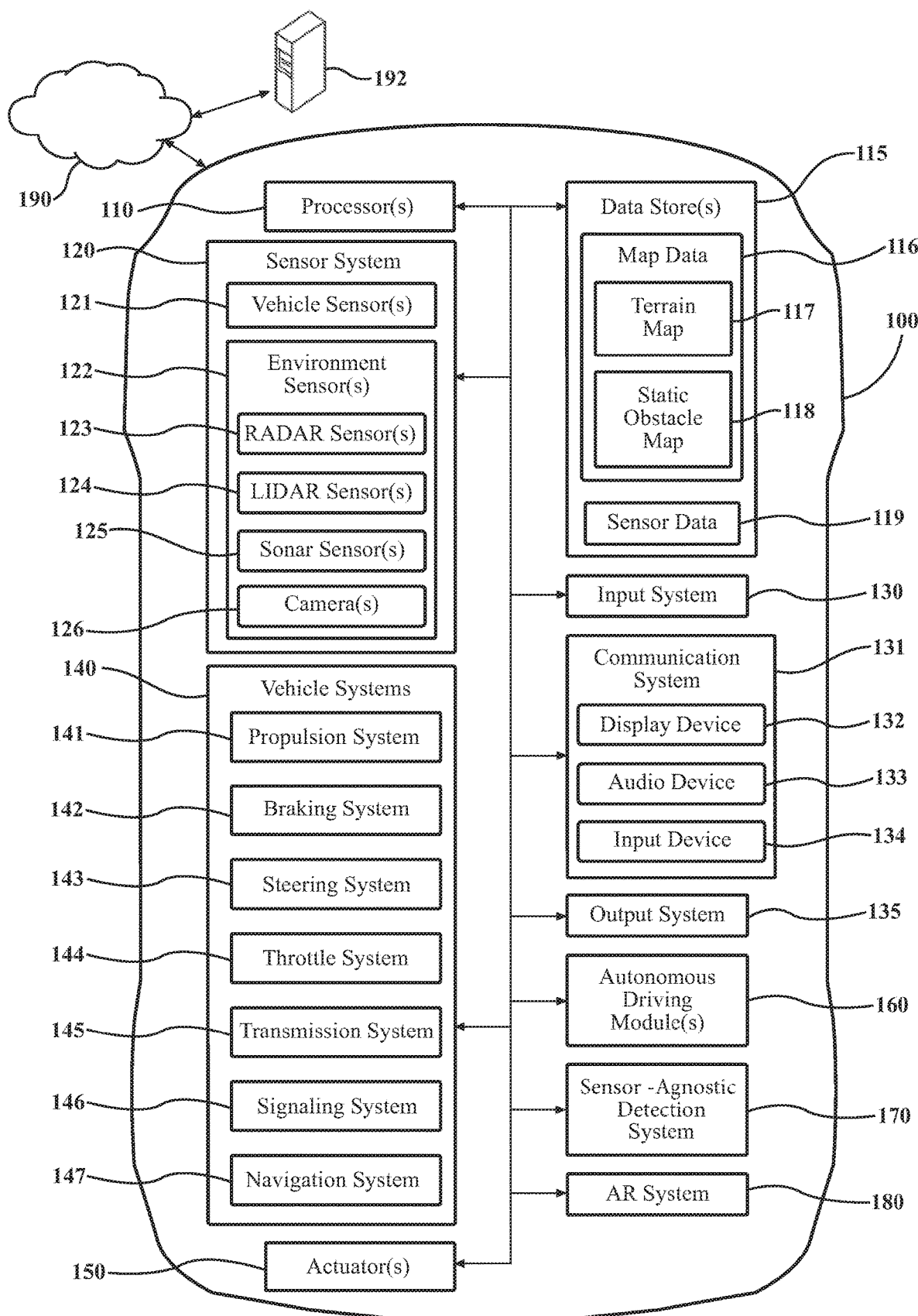
FIG. 1 is a block diagram of a vehicle usable as part of a sensor-agnostic detection system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate autonomously, semi-autonomously, or manually by an in-vehicle operator. The vehicle 100 can include a sensor-agnostic detection system 170 or capabilities to support the sensor-agnostic detection system 170, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a more thorough understanding of the embodiments described herein. Those of skill in the art, however, will understand that the embodiments described herein may be practiced using various combinations of these elements.

Figure 2:
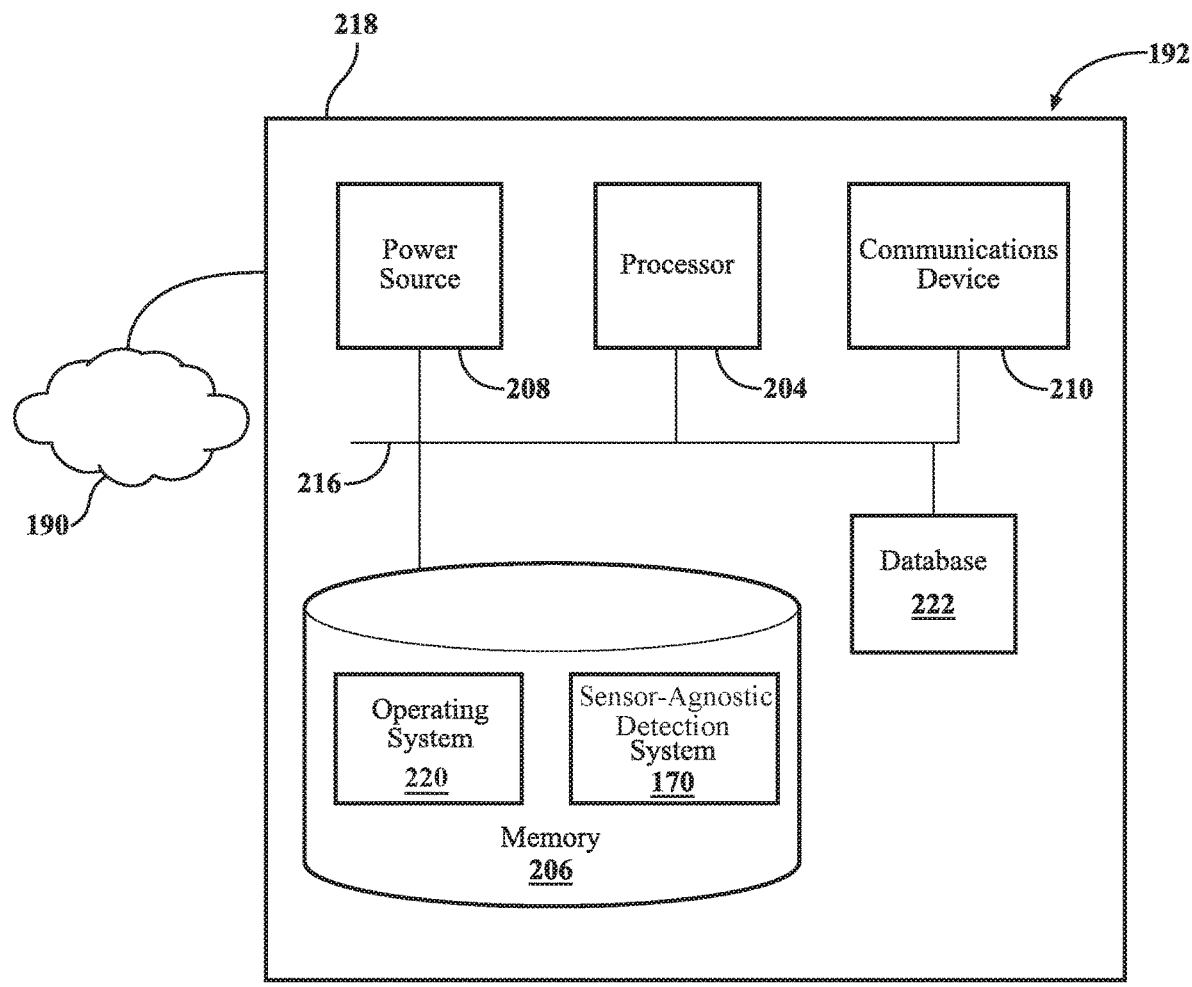
FIG. 2 is a block diagram of a server usable as part of the sensor-agnostic detection system, according to embodiments described herein.

FIG. 2 is a block diagram of the server 192, as shown in FIG. 1, according to one or more embodiments. The server 192 can contain various components for performing the functions that are assigned to the said server. The components can include a processor 204, like a central processing unit (CPU), a memory 206, a power source 208, communications device 210, input and/or output devices, and at least one bus 216 that connects the aforementioned components. In some embodiments, these components are at least partially housed within a housing 218.

The processor 204, which can also be referred to as a CPU, can be a device which is capable of receiving and executing one or more instructions to perform a task as part of a computing device. In one embodiment, the processor 204 can include a microprocessor such as an application-specific instruction set processor (ASIP), graphics processing unit (GPU), a physics processing unit (PPU), a digital signal processor (DSP), an image processor, a co-processor, or others. Though referenced as the processor 204, it is understood that one or more processors 204 can be used in one or more embodiments described herein, including combinations of processors 204.

The memory 206 can include volatile and/or non-volatile memory. The memory 206 can further include a computer-readable storage medium. Examples of suitable memory 206 include RAM (Random Access Memory), flash memory, ROM (Read-Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 206 can be a component of the processor(s) 204, or the memory 206 can be operably connected to the processor(s) 204 for use thereby. The memory 206 can include an operating system 220, such as LINUX. The operating system 220 can include batch, live, time-sharing, real-time, and other types of operating systems. The operating system 220, as described herein, can include instructions for processing, accessing, writing, storing, searching data, or other functions as selected by the user for controlling and providing an interface with the server 192. The memory 206 can include communications procedures for communicating with the network 190, computing devices, a vehicle 100, and/or another server.

The communication device 210 can be wired or wireless connection components and/or software allowing the server 192 to communicate with other computing devices. The communication device 210 can allow communication with devices either locally or remotely, such as over a network protocol (e.g., Ethernet or similar protocols). In one example, the server 192 is connected to the network 190 using the communication device 210. The communication device 210 can further be connected with remote devices associated with other computing devices. In one example, the communication device 210 is connected with the sensors system 120 and the data store 115 through the vehicle 100. In further embodiments, the server 192 can connect with one or more servers, allowing access to one or more sensors, which are connected to or in connection with the second server. The one or more sensors can include one or more of the sensors of the sensor system 120, described with reference to FIG. 1.

The server 192 can further include the sensor-agnostic detection system 170 or components thereof. As described herein, certain components of the sensor-agnostic detection system 170 can be stored in the vehicle 100, in the server 192 or combinations thereof. As such, one or more embodiments of the sensor-agnostic detection system 170 can include the sensor-agnostic detection system 170, modules thereof, or components thereof as being stored, collected, created, compared or otherwise made available from the memory 206 or the database 222 of the server 192. When stored as part of the server 192, the sensor-agnostic detection system 170 can access the vehicle 100, another server 192, one or more sensors, or other devices through the communications device 210 and the network 190, allowing for continuity between the one or more components which comprise the sensor-agnostic detection system 170, as disclosed herein.

Figure 3:
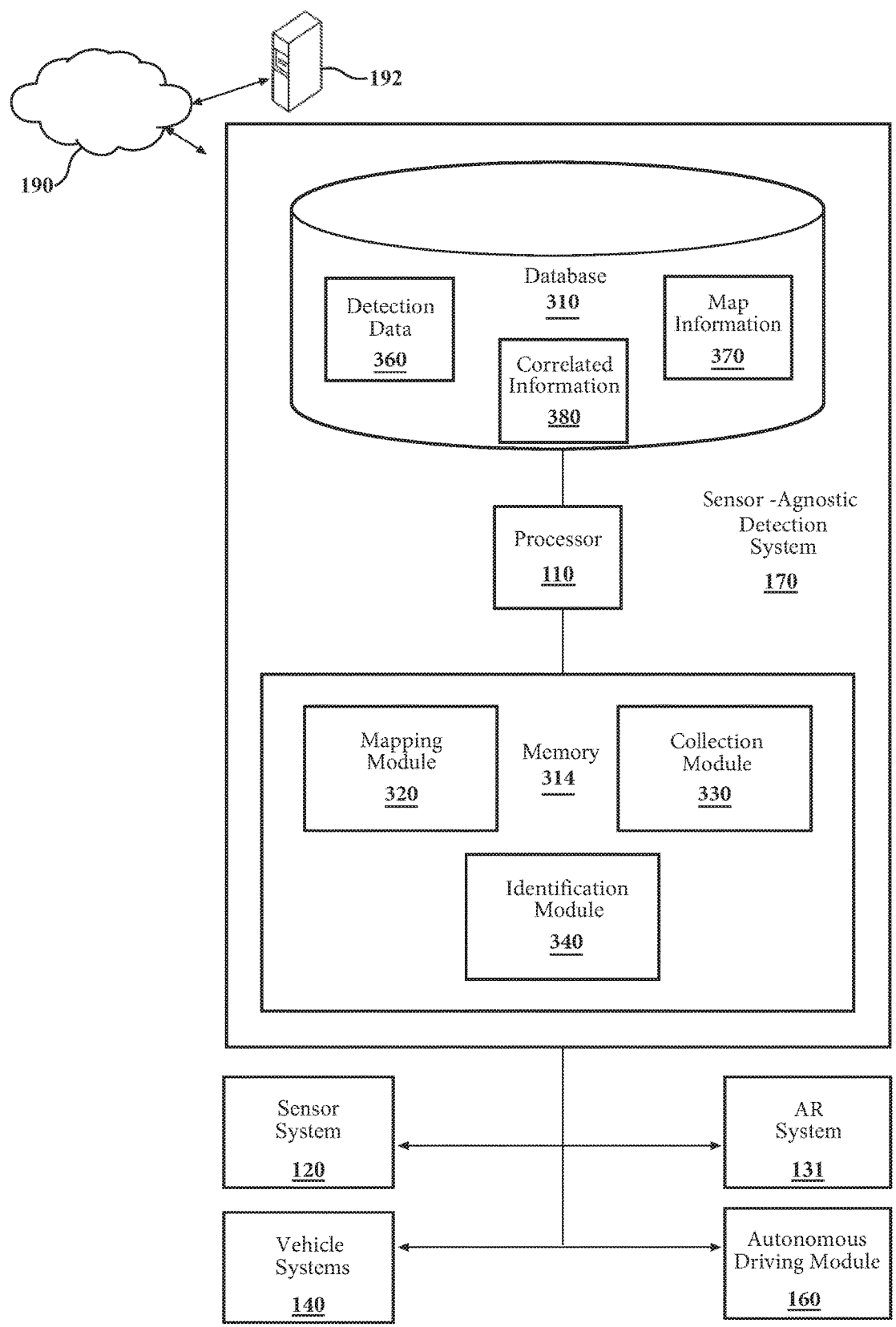
FIG. 3 is an illustration of the sensor-agnostic detection system for object recognition in a vehicular environment, according to embodiments described herein.

The discussion of the sensor-agnostic detection system 170 begins at FIG. 3, with an illustration of the sensor-agnostic detection system 170, according to one embodiment. The sensor-agnostic detection system 170 is shown as including the processor 110 from the vehicle 100, depicted in FIG. 1. Accordingly, the processor 110 can be a part of the sensor-agnostic detection system 170, the sensor-agnostic detection system 170 can include a separate processor from the processor 110 or the sensor-agnostic detection system 170 can access the processor 110 through a data bus or another communication path. In one embodiment, the sensor-agnostic detection system 170 includes the memory 314 that stores a mapping module 320, a collection module 330 and an identification module 340. The memory 314 is a RAM, ROM, a hard disk drive, a flash memory, or other suitable memory for storing the modules 320, 330, and 340. The modules 320, 330, and 340 are, for example, computer-readable instructions that when executed by the processor 110, cause the processor 110 to perform the various functions disclosed herein.

The sensor-agnostic detection system 170 can further include a database 310. The database 310 can be presented in a number of configurations, including as part of the memory 314, as an independent component from the memory 314, as part of a separate memory (distinct from memory 314), or others. The database 310 can include detection data 360, map information 370, and correlated information 380. The detection data 360 can include data sets as detected from the vehicular environment by one or more sources, such as from a plurality of detecting vehicles, a survey vehicle or others. The detection data 360 can include data sets from multiple vehicles, as transmitted through a network 190 from a server 192, as well as data collected from one or more sensors, such as from a sensor system 120. The map information 370 can include information related to one or more features of an object in the vehicular environment. The correlated information 380 is information collected by one or more sensors in one or more vehicles collected over time in relation to a specific object in the vehicular environment. Though the sensor-agnostic detection system 170 is shown as part of the vehicle 100, the sensor-agnostic detection system 170 or portions thereof, can be stored in a separate vehicle, on a computing device, such as the server 192, or others. As such, one or more of the functions of the sensor-agnostic detection system 170 or the modules contained therein, can be performed remotely and transferred to vehicle 100 as part of the embodiments described herein.

The mapping module 320 can generally include instructions that function to control the processor 110 to extract one or more survey features from a survey data set, the survey data set collected from a survey sensor type. The survey data set can be an exemplary data set collected by one or more vehicles about one or more objects in a vehicular environment. The vehicular environment is an environment that is configured for and/or used primarily by vehicles. The survey sensor type is a sensor type which is used to collect the survey data set. The sensor type can be general sensor type or category, such as an image capture device or an audio capture device. In another embodiment, the sensor type can be a specific sensor, such as LiDAR or a camera. The survey data set can be collected by a sensor source in the environment, such as one or more detecting vehicles or one or more survey vehicles. One or more detecting vehicles are vehicles which are collecting information as part of their existence in the environment, through one or more sensors located on the detecting vehicle. The detecting vehicles can collect sensor data in the vehicular environment while performing other functions, such as autonomous driving. The one or more survey vehicles are vehicles which are equipped with a variety of sensors and enter the environment to collect sensor data for mapping the environment. The survey data set can be collected and stored as part of the correlated information 380, as stored in the database 310.

The survey data set can be collected from a survey sensor type regarding one or more objects in the vehicular environment. The objects are the distinct components which make up the vehicular environment, such as street signs, rocks, foliage, roads, and others. As the survey sensor type has a specific detection mechanism, the survey data set will be in a form that reflects the detection mechanism of the survey sensor type. For example, the survey data set as provided by LiDAR is expected to include information on the light as reflected from one or more objects, such as intensity of the laser pulse on return, return number, point classification, RGB (red, green, and blue) bands, scan angle/direction, and others. Thus, the information provided can be easily correlated with other sensor data derived from LiDAR to determine the location of objects in the vehicular environment. In one or more embodiments, the survey data set can be collected over a period of time from a variety of sources, including a variety of sensor types.

The one or more survey features can then be extracted from the survey data set by the mapping module 320. The survey features can be extracted high-level information about the object, as derived from the data set. High-level information refers to descriptions or data which are derived from the data set but are independent of sensor type or data source. High-level information can include verbal descriptions of an object, object dimensions, roughness, weight, composition, or any other parameter of the object which can be discerned from the data set. The survey data set can be used to derive the survey features in a way that is sensor-agnostic, meaning that the survey features can be applied to data received from any sensor type. The survey features can include model information and pose information about the object. Model information is information which describes the visible dimensions of the objects, such as one or more shapes or positions in a coordinate space. The pose information is the location and orientation of the object in the environment. The survey features can then be stored as part of the map information 370.

In a further embodiment, the survey data set can include data from a plurality of sensors. The plurality of sensors will collect the survey data set using the detection scheme that is native to that sensor, such as laser reflection, refraction, absorbance, dispersion, and others as a detection scheme when using LiDAR. As such, the survey data set will include information about the same vehicular environment, though not necessarily in a form that can be associated readily. The one or more survey features can then be extracted from the survey data set in light of the sensor type. The extracted features can then be correlated between the different sensor types to describe details of the object, confirm specific measurements or others.

The mapping module 320 can further include instructions to control the processor 110 to map the one or more survey features to a feature-based map of a vehicular environment. The feature-based map is a map of the one or more features as determined above. The feature-based map includes the geographic position of each feature, as associated with an object in the vehicular environment, and the comparative distance between said objects and features as appropriate. The one or more survey features are localized on the feature-based map with relation to the location and direction that the survey data set was collected and the object associated with the survey data set. The feature-based map can then be incorporated as part of the map information 370. The map information can then be stored in the database 310. The object, as used herein, can be an element of the vehicular environment or any portion thereof, such as a road, a sign, a vehicle, or others. The object, as detected by the mapping module 320 can include stationary or mobile objects. Further, the survey features about objects may be generalized to allow for detection of transient objects or related objects, as collected in the survey data set.

The collection module 330 can generally include instructions that function to control the processor 110 to collect an input data set using an input sensor type. In one or more embodiments, the input sensor type can be different from the survey sensor type. The input data set is a data set collected by a vehicle in the vehicle environment as part of a vehicle control scheme. Vehicle control schemes can include elements which allow for control of one or more vehicle systems, such as autonomous control, object detection or recognition, vehicle localization, and others. The input data set can be collected individually by the one or more detecting vehicles. In another embodiment, the input data set can be collected by collaboration between the one or more detecting vehicles. The input data set can include information regarding objects in the vehicular environment collected over a period of time as taken from the one or more detecting vehicles. The input sensor type can include a sensor type which differs from the survey sensor type. In one embodiment, the input sensor type includes a plurality of sensors, where at least one of the sensors are of a sensor type which is different from the survey sensor type. As such, the input sensor type can produce an input data set which is a different format from the survey data set. Further, the input data set may comprise data from multiple sensors. The input data set can be stored as part of the detection data 360 in a database, such as the database 310.

The collection module 330 can further include instructions to extract one or more input features from the input data set. The input features can be extracted high-level information about the object, as derived from the input data set. The input data set can be used to derive the one or more input features to correspond with an equivalent feature of the one or more survey feature, such that the input data can be compared to the survey data regardless of sensor type. As with the survey features, the input features can include model information and pose information about the object. In a further embodiment, the input data set can include data from a plurality of sensors. The plurality of sensors on the one or more detecting vehicles can collect the input data set using the detection scheme that is native to that sensor. As such, the input data set will include information about the same vehicular environment from the one or more detecting vehicles. The one or more input features can then be extracted from the input data set in light of the sensor type. The input features can then be correlated between the different sensor types for use in detection, localization, or other schemes.

The identification module 340 can generally include instructions that function to control the processor 110 to correlate the one or more input features to the one or more survey features. The input features and the survey features are extracted sensor-agnostic components, from separate sources and sensor types, regarding the one or more objects of a vehicular environment. In one or more embodiments, the input features and the survey features are high-level descriptions of the one or more objects. As such, the input features can be compared to the survey features for vehicle localization, object recognition, and others as used by the detecting vehicle in the vehicular environment.

The input features can be compared to the survey features in light of any limitations of the input data set or the survey data set. In one embodiment, the input features may be more limited than the survey features. The input features can provide information as available from a specific perspective. For example, obstructed views of an object will not be accounted for in the input features. Further, the input features can provide information as determinable based on a specific sensor type. For example, a sound based sensor, such as SONAR, can provide limited or no information on the color or reflectivity of an object. In this embodiment, the survey features can be limited to compare for available data points. Similarly, if the survey data is more limited than the input data, the input data can be reduced such that the data is compared equivalently. In further embodiments, the input features can include extrapolations to assist in comparison to the survey features.

The identification module 340 can further include instructions to identify an object in the feature-based map as related to the input data set from the vehicular environment. After the comparison of the input features to the survey features, an object match can be determined from the objects of the feature-based map. In the case of an imperfect match, the object can be selected from the feature-based map based on the likelihood that the input features match the survey features. Once the object is selected, the feature-based map can present correlated information 380 about the object to the detecting vehicle. The correlated information 380 is information derived from one or more sensors about the object. The correlated information 380 can include information from a variety of sensors, information from a variety of vehicles, information collected over a period of time, the input data set, publicly available information about the object or a type of object, or others to assist with one or more processes. The correlated information 380 can include the survey data set, input data sets as collected from a variety of sources over time, the input data set from the one or more detecting vehicles and others as available. The correlated information 380 can provide information that would not otherwise be available to the detecting vehicle, such as information regarding an obscured view of the object.

In an optional embodiment, the identification module 340 can further include instructions to update or modify the feature-based map using the input features and the input data set. The input features and the input data set can include information regarding one or more parameters of the object that are not available from the survey data set. As such, the input features can be used to describe the object further when appropriate. The input features can be added to the feature-based map using points of overlap with the survey features. This will allow proper internal correlation between the input features and the survey features. In one embodiment, the input features can be added to the map to clarify previous additions to the map, as new input features may include a better view of preexisting data than either previously added input features or the survey features. Similarly, the input data set can be added to the correlated information for access after the determination of an object by another one or more detecting vehicles.

Figure 4:
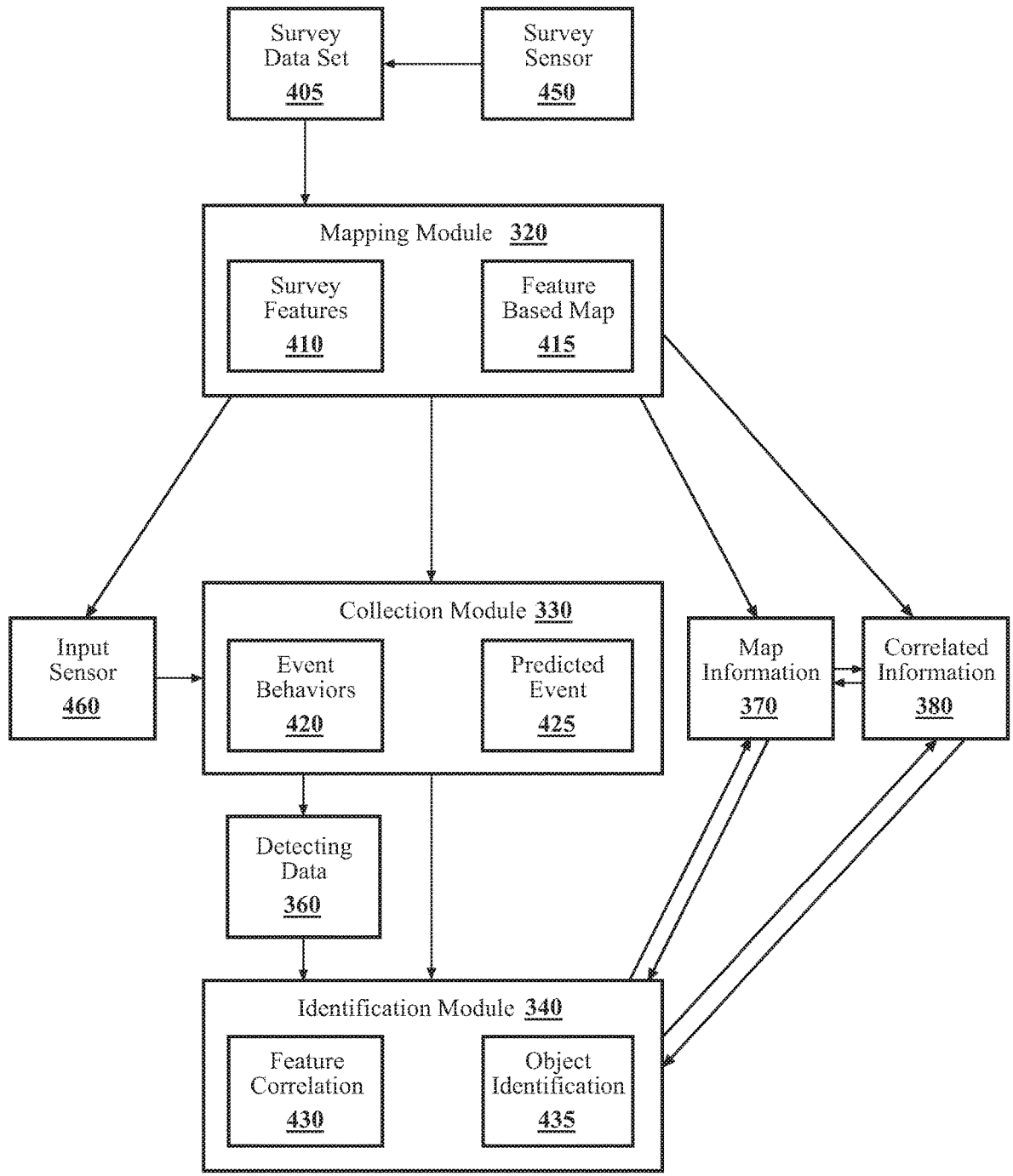
FIG. 4 is a schematic of the sensor-agnostic detection system, according to one or more embodiments.

FIG. 4 depicts a schematic 400 of the sensor-agnostic detection system 170, according to one or more embodiments. The sensor-agnostic detection system 170 uses survey data from a survey sensor to prepare survey features for objects in the feature-based map. The detecting vehicles, as they move through the environment, collect input data from at least one input sensor, the input sensor possibly being a different sensor type from the survey sensor. The sensor-agnostic detection system 170 can then prepare input features from the input data set, the input features being a high-level description extracted from the input data set. The input features can then be compared against the survey features to determine objects in the environment. Thus, the sensor-agnostic detection system 170, can allow for localization and detection using a comparison between two dissimilar sensor types, without sensor-specific conversion of the sensor data and without using more expensive sensors for the input detections.

The schematic 400 of the sensor-agnostic detection system 170 can begin with the survey data set 405 being delivered to the mapping module 320. The survey data set 405 is a data set which maps an environment using a survey sensor 450 as described above. The mapping module 320, as described above, includes instructions to extract survey features 410 from the survey data set 405. The survey features 410 are the high-level description of the objects in the vehicular environment and are incorporated by the mapping module 320 into the feature-based map 415. The survey features 410 are incorporated with information regarding the position and orientation in the feature-based map 415, as related to the vehicular environment which the feature-based map 415 represents. The mapping module 320 can then transmit the feature-based map 415 to the map information 370. Further, the mapping module 320 can then transmit the survey data set 405, and the survey features 410 to the correlated information 380. The feature-based map 415 of the map information 370 can further be associated to the correlated information 380 based on the feature and object, such that the correlated information 380 can be referenced in light of an object being determined to exist in the feature-based map 415.

The collection module 330 can then receive the input data set 420 from an input sensor 460, the input sensor 460 being of a different sensor type from the survey sensor 450. The input data set 420 can include detection information about the object in the vehicular environment. The collection module 330 can include instructions to extract the input features 425 from the input data set 420. The input features can be a high-level description of the object, based on the input data set 420. The collection module 330 can then store the input data set 420, and the input features 425 as part of the detection data 360. The input data set 420, the input features 425, and the detection data 360 can then be transmitted or made available to the identification module 340.

The identification module 340 can form a feature correlation 430 from the input features 425, and the survey features 410. The feature correlation 430 can be correlations between the features of one or more objects as presented in the feature-based map 415 in the map information 370. The feature correlations 430 can include correlations between various feature components such as pose, general shapes, object type if available and more as well as object location within the map. With consideration of the possibility of more than one object being correlated, especially when comparing sensors which vary dramatically, the feature correlation 430 can further include weighting of features such that one object can be selected over another with specificity.

The feature correlation 430 can then be applied to an object identification 435. The object identification 435 is the association of the input features 425 to the object in the vehicular environment, in light of the feature-based map. The object identification 435 can include receiving the correlation information 380 regarding the object as related to the feature correlation 430. Further, using the correlation information 380 and the object identification 435, the feature-based map 415 and the correlated information 380 can be updated, as described in FIG. 3. As such, the input data set 420 from the input sensor 460 can be compared to survey data set 405 collected from a survey sensor 450, allowing for more precise detection using different sensors.

As such the sensor-agnostic detection system 170 provides numerous benefits to sensor-equipped vehicles in a vehicular environment. First, the sensor-agnostic detection system 170 allows a detecting vehicle to use cheaper sensors while still having information from more expensive sensor available. Further, the sensor-agnostic detection system 170 provides information that would otherwise not be available to the detecting vehicle, regardless of sensor quality. Finally, the sensor-agnostic detection system 170 allows data collected from numerous sensor types to be used in detection in a related fashion, thus reducing inaccuracy and increasing efficiency of the detection process.

Figure 5A:
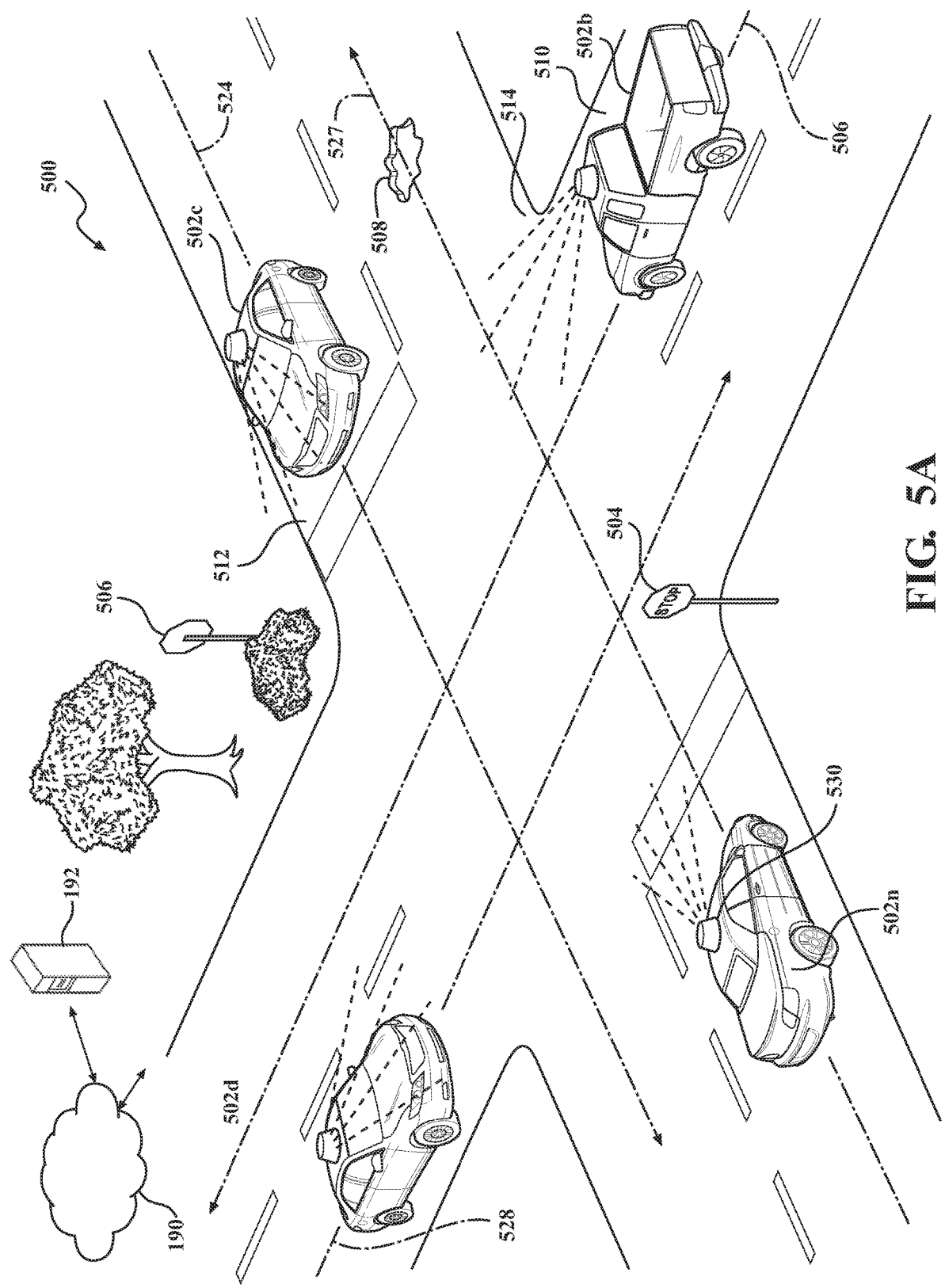
FIGS. 5A and 5B depict an operator in a vehicle incorporating the sensor-agnostic detection system, according to embodiments described herein.
Figure 5B:
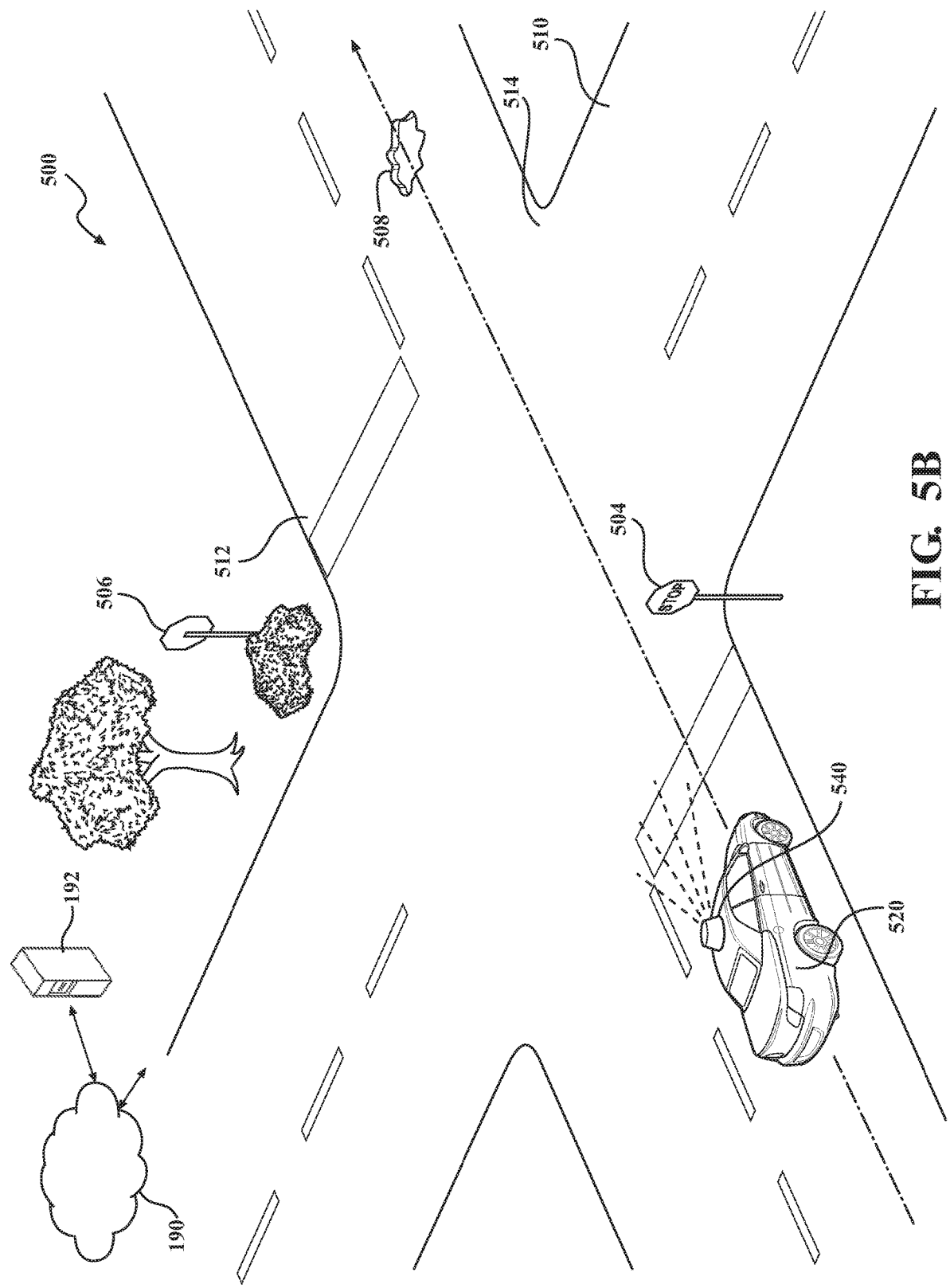

FIGS. 5A and 5B depict a plurality of vehicles in a vehicular environment 500 employing the sensor-agnostic detection system 170, according to one or more embodiments. FIG. 5A depicts the survey vehicles 502a, 502b, 502c, and 502d in a vehicular environment 500, according to one embodiment. FIG. 5B depicts a detecting vehicle 520 in the vehicular environment 500, according to one embodiment. In FIG. 5A, the vehicular environment is shown being surveyed by the survey vehicles 502a, 502b, 502c, and 502d. The survey vehicles 502a, 502b, 502c, and 502d can be substantially similar to the vehicle 100, described with reference to FIG. 1, including any or all elements described therein. The vehicular environment 500 can include a first road 510 intersecting with a second road 512 at an intersection 514. The survey vehicles 502b and 502d are shown at the intersection on the first road 510. The survey vehicles 502a and 502c are shown at the intersection 514 on the second road 512 at the first stop signs 504 and the second stop sign 506, respectively.

The survey vehicles 502a, 502b, 502c, and 502d collect one or more survey data sets from the vehicular environment 500. Each of the survey vehicles 502a, 502b, 502c, and 502d collects the survey data set from their respective perspectives for each direction on the first road 510 and the second road 512 using a survey sensor 530 (e.g., a LiDAR sensor). The survey vehicle 502a collects data as available by a first route 522 as part of the first survey data set. As such, the first survey data set can include the first path 522 of the second road 512, including road markings, the front of the first stop sign 504, the intersection 514, the back of the second stop sign 506, and the pothole 508. The survey vehicle 502c collects data as available by a second route 524 as part of the second survey data set. As such, the second survey data set can include the second route 524 of the second road 512, including road markings, the front of the second stop sign 506, the intersection 514, and the back of the first stop sign 504. The survey vehicle 502b collects data as available by the third route 526 as part of the third survey data set. As such, the third survey data set can include a third path 526 of the first road 510, including road markings, and the intersection 514. The survey vehicle 502d collects data as available by a fourth route 528 as part of the third survey data set. As such, the third survey data set can include the third path 528 of the first road 510, including road markings, and the intersection 514. The objects discussed herein are just a sample of the variety of objects expected to be detected in the vehicular environment 500, and are not intended to be limiting of the detections in the survey data sets.

The first survey data set, the second survey data set, the third survey data set, and the fourth survey data set (hereinafter "the survey data set") can be stored in a data store, such as a data store 115 in the survey vehicles 502a, 502b, 502c, and 502d. In further embodiments, the survey data set can be stored in a server, such as the server 192, described with reference to FIG. 2. The server 192 can be connected through the network 190 to the survey vehicles 502a, 502b, 502c, and 502d, as shown in FIG. 5A, and to the detecting vehicle 520, as shown in FIG. 5B. In FIG. 5B, the detecting vehicle 520 can then access the server 192 for the survey data set. The detecting vehicle 520 can be substantially similar to the vehicle 100, described with reference to FIG. 1. The detecting vehicle 520 can further include one or more modules of the sensor-agnostic detection system 170, described with reference to FIGS. 3 and 4. In one or more embodiments, the mapping module 320 can be included as part of the server 192, as part of the detecting vehicle 520, and/or as part of the survey vehicles 502a, 502b, 502c, and 502d. As shown here, using the mapping module 320, the detecting vehicle 520 extracts the survey features from the survey data set to produce or modify the feature-based map. The feature-based map can be substantially similar to the feature-based map described with reference to FIGS. 3 and 4. Using LiDAR as an example of the survey sensor, the survey features can include general shapes and spacing, sizes of the objects, positioning of the objects relative to other objects and the survey vehicles 502a, 502b, 502c, and 502d, and others.

Either simultaneously or sequentially with the extraction of survey features and production of the feature-based map, the detecting vehicle 520 can collect the input data set from the vehicular environment 500. The detecting vehicle 520 collects data as available by the first route 522 as part of the first survey data set using an input sensor 540 (e.g., a video camera). The input sensor is a different sensor than the survey sensor. As such, the input data set can include the first path 522 of the second road 512, including road markings, the front of the first stop sign 504, the intersection 514, the back of the second stop sign 506, and the pothole 508. The detecting vehicle 520 can then extract the input features from the input data set, which correspond to the detected objects in the environment, and then store the input data set and the input features as part of the detection data 360, described with reference to FIG. 3. Using a camera as an example of an input sensor, the input features can include general shapes and spacing, sizes of the objects, the positioning of the objects relative to other objects and the detecting vehicle 520, and others.

The detecting vehicle 520 then uses instructions from the identification module 340 to correlate the input features of the first path 522 of the second road 512, including road markings, the front of the first stop sign 504, the intersection 514, the back of the second stop sign 506, and the pothole 508 with the survey features as detected by the survey vehicles 502a, 502b, 502c, and 502d. Though the LiDAR data from the survey vehicles 502a, 502b, 502c, and 502d would be incompatible with the visual data from a camera, the extracted features from the two are compatible regardless of sensor type. It is expected that the survey features as detected by each of the survey vehicles 502a, 502b, 502c, and 502d will correlate to some extent with the input features from the detecting vehicle 520, with high correlation to the survey features as extracted from the first survey data set from the survey vehicle 502a. The correlation described here can include correlation between the input features and the survey features, as well as the correlation between the survey features as extracted from the first survey data set, the second survey data set, the third survey data set, and the fourth survey data set internally. Thus, the input features can be determined to relate to objects in the vehicular environment, specifically the second road 512, the first stop sign 504, the intersection 514, the second stop sign 506, and the pothole 508. Thus, the detecting vehicle 520 can use the survey data sets derived from the survey sensor 530 for recognition of objects or localization of the detecting vehicle 520, regardless of the sensor type of the input sensor 540.

Since the object in the vehicular environment 500 has been previously associated with the respective survey data sets from the survey vehicles 502a, 502b, 502c, and 502d, all detected objects can further include information collected from angles that are unavailable to the detecting vehicle 520. As such, in one or more embodiments, the detecting vehicle 520 can include data from all four angles of the survey vehicles 502a, 502b, 502c, and 502d for the pothole 508. Thus, even a low detail correlation between the input data set at the pothole 508 with the survey data set, will yield high-quality object information, as retrieved from the survey data set in the correlated information 380.

The sensor-agnostic detection system 170 can thus provide numerous benefits for the vehicles in the vehicular environment. The sensor-agnostic detection system 170 allows for the use of a variety of sensors in detecting environmental objects. Further, as the survey data set is expected to be of higher quality than that collected by the detecting vehicle 520 in the environment, the detecting vehicle 520 can use features from the input data set, to get higher quality data from the survey data set. Thus, by using the sensor-agnostic detection system 170, the detecting vehicle 520 can perform more efficiently with lower cost equipment in the vehicular environment.

Figure 6:
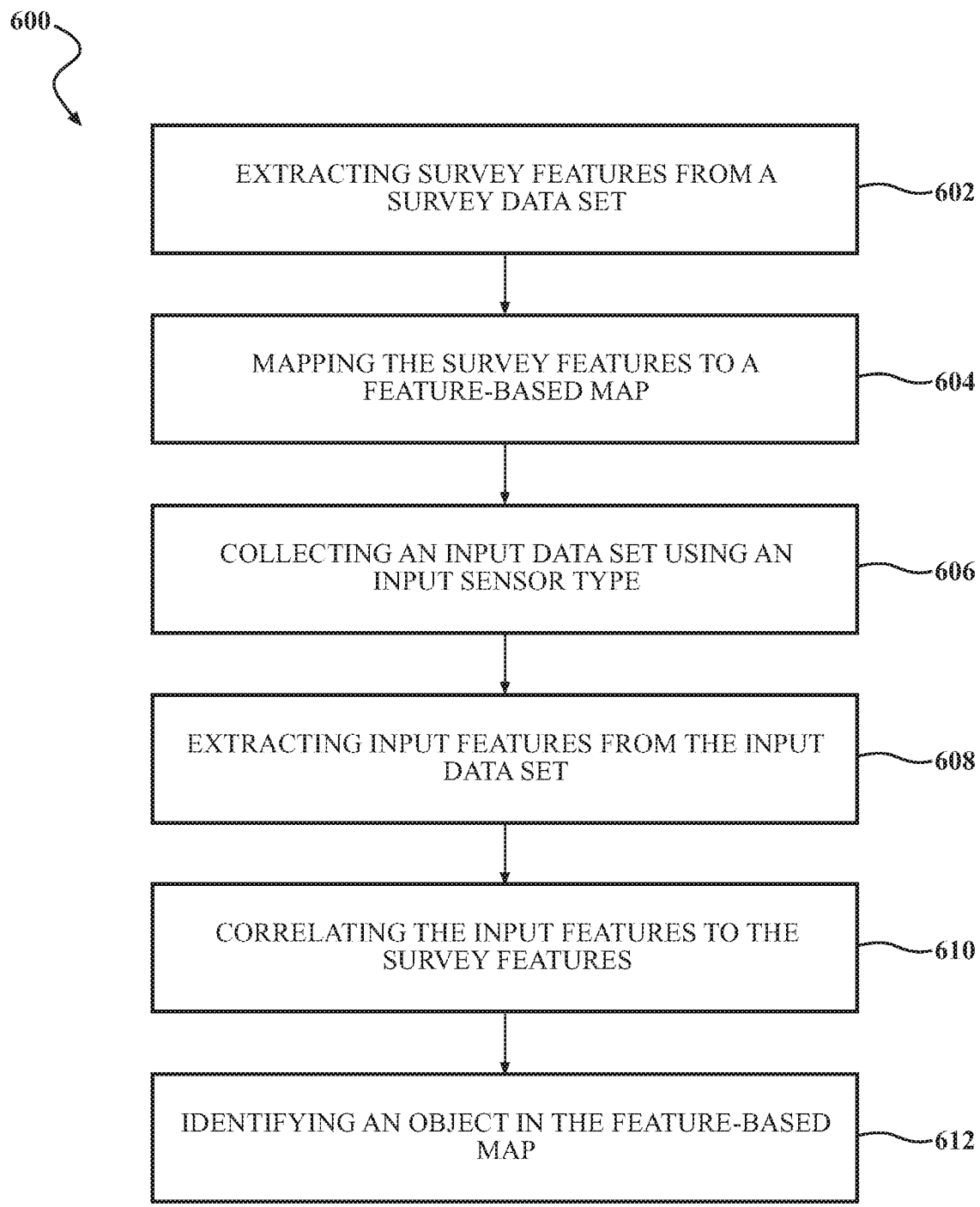
FIG. 6 is a block diagram of a method for object recognition in a vehicular environment, according to one or more embodiments.

FIG. 6 is a block diagram of a method 600 for object recognition in a vehicular environment, according to one or more embodiments herein. The method 600 extracts one or more features from data received from a survey sensor type. These features can then be compared to features extracted from an input sensor type. Thus, the method 600 allows detection of objects using different sensor types. As described herein, the method 600 can include extracting one or more survey features from a survey data set, the survey data set collected from a survey sensor type, at 602. Then, the one or more survey features can be mapped to a feature-based map of a vehicular environment, at 604. An input data set can be collected using an input sensor type, the input sensor type being different from the survey sensor type, at 606. One or more input features can then be extracted from the input data set, at 608. The one or more input features can then be correlated to the one or more survey features, at 610. Finally, an object in the feature-based map can be identified as related to the input data set from the vehicular environment, at 612.

The method 600 can begin by extracting one or more survey features from a survey data set, the survey data set collected from a survey sensor type, at 602. The survey data set, as described above, can be an exemplary data set collected by one or more vehicles about one or more objects in a vehicular environment. The survey sensor type is a sensor type which is used to collect the survey data set and can be general sensor type or category or a specific sensor. The survey data set can be collected by a sensor source in the environment, such as one or more detecting vehicles or one or more survey vehicles. The survey features can be extracted high level information about the object, including verbal descriptions of an object, object dimensions, roughness, weight, composition, or any other parameter of the object which can be discerned from the data set. The survey features can include model information and pose information about the object.

In an optional embodiment, the method 600 can include collecting data from a plurality of sensors for the survey data set. The plurality of sensors will collect the survey data set using the detection scheme that is native to that sensor, such as laser reflection, refraction, absorbance, dispersion, and others as a detection scheme when using LiDAR. The one or more survey features can then be extracted from the survey data set in light of the sensor type. The extracted features can then be correlated between the different sensor types to describe details of the object, confirm specific measurements or others.

The extraction of features from the survey data set can be performed as part of a system, such as the sensor-agnostic detection system 170, described with reference to FIG. 3. The sensor-agnostic detection system 170 can include the mapping module 320. The mapping module 320 can generally include instructions that function to control the processor 110 to extract one or more survey features from a survey data set, the survey data set collected from a survey sensor type. The survey data set can be substantially similar to the survey data set, described with reference to FIGS. 3 and 4. The survey data set can be collected in a substantially similar fashion to the survey data set, described with reference to FIGS. 3 and 4. The survey data set and the survey features can be stored as part of the map information 370. The map information 370 can be stored in a database, such as the database 310, described with reference to FIG. 3.

Then, the one or more survey features can be mapped to a feature-based map of a vehicular environment, at 604. The feature-based map is a map of the one or more features as determined above. The feature-based map includes the geographic position of each feature, as associated with an object in the vehicular environment, and the comparative distance between said objects and features as appropriate. In one or more embodiments, the feature-based map can be substantially similar to the feature-based map as described with reference to FIGS. 3 and 4. The one or more survey features can be localized on the feature-based map with relation to the location and direction that the survey data set was collected and the object associated with the survey data set. The object, as used herein, can be any element of the vehicular environment or any portion thereof, such as a road, a sign, a vehicle, or others. The object, as detected by the method 600 can include stationary or mobile objects. Further, the survey features about objects may be generalized to allow for detection of transient objects or related objects, as collected in the survey data set.

The mapping of features to the feature-based map can be performed as part of a system, such as the sensor-agnostic detection system 170, described with reference to FIG. 3. The sensor-agnostic detection system 170 can include the mapping module 320. The mapping module 320 can further include instructions to control the processor 110 to map the one or more survey features to a feature-based map of a vehicular environment. The survey features can be associated with the feature-based map, based on one or more objects in the environment, as detected by one or more sensors. The feature-based map can then be incorporated as part of the map information 370. The map information 370 can be stored in a database, such as the database 310, described with reference to FIG. 3.

An input data set can be collected using an input sensor type, the input sensor type being different from the survey sensor type, at 606. The input data set is a data set collected by a vehicle in the vehicle environment. The input data set can be collected individually by the one or more detecting vehicles. In another embodiment, the input data set can be collected by collaboration between the one or more detecting vehicles. The input data set can include information regarding objects in the vehicular environment collected over a period of time as taken from the one or more detecting vehicles. The input sensor type can include a sensor type which differs from the survey sensor type. In one embodiment, the input sensor type can include a plurality of sensors, where at least one of the sensors are of a sensor type which is different from the survey sensor type. As such, the input sensor type can produce an input data set which is a different format from the survey data set. Further, the input data set may comprise data from multiple sensors.

The collection of the input data set can be performed as part of a system, such as the sensor-agnostic detection system 170, described with reference to FIG. 3. The sensor-agnostic detection system 170 can include the collection module 330. The collection module 330 can generally include instructions that function to control the processor 110 to collect an input data set using an input sensor type, the input sensor type being different from the survey sensor type. The one or more detecting vehicles can be equipped with one or more sensor, including the input sensor type, as part of the sensor system 120. Through instructions from the collection module 330, the detecting vehicle can collect the input data set, as described with reference to FIG. 3. The input data set can be stored as part of the detection data 360. The detection data 360 can be stored in a database, such as the database 310, described with reference to FIG. 3.

One or more input features can then be extracted from the input data set, at 608. The input data set can be used to derive the one or more input features from corresponding with an equivalent feature of the one or more survey feature. The input features can be extracted high-level information about the object, as derived from the input data set. As with the survey features, the input features can include model information and pose information about the object. In a further embodiment, the input data set can include data from a plurality of sensors. The plurality of sensors on the one or more detecting vehicles can collect the input data set using the detection scheme that is native to that sensor. As such, the input data set will include information about the same vehicular environment from the one or more detecting vehicles. The one or more input features can then be extracted from the input data set in light of the sensor type. The input features can then be correlated between the different sensor types for use in detection, localization, or other schemes.

The mapping of features to the feature-based map can be performed as part of a system, such as the sensor-agnostic detection system 170, described with reference to FIG. 3. The sensor-agnostic detection system 170 can include the collection module 330. The collection module 330 can further include instructions to extract one or more input features from the input data set. The survey features can be associated with the feature-based map, based on one or more objects in the environment, as detected by one or more sensors. The feature-based map can then be incorporated as part of the map information 370. The map information 370 can be stored in a database, such as the database 310, described with reference to FIG. 3.

The one or more input features can then be correlated to the one or more survey features, at 610. The input features and the survey features can be substantially similar to the input features and/or survey features, described with reference to FIG. 3. In one or more embodiments, the input features and the survey features can be high-level descriptions of the one or more objects. As such, the input features can be compared by the method 600 to the survey features for vehicle localization, object recognition, and others. The method 600 can include comparing the input features to the survey features, such as in light of any limitations of the input data set or the survey data set. In further embodiments, the input features can include extrapolations to assist in comparison to the survey features.

The correlation of the input features to the feature-based map can be performed as part of a system, such as the sensor-agnostic detection system 170, described with reference to FIG. 3. The sensor-agnostic detection system 170 can include the identification module 340. The identification module 340 can generally include instructions that function to control the processor 110 to correlate the one or more input features to the one or more survey features. The input features can be associated with the feature-based map through the survey features. The identification module 340 can include instructions to associate one or more components of the input features to one or more components of the survey features to find one or more correlations. The correlations can include location information, feature information, and others which either associate or eliminate possible detections from the vehicular environment. The correlation can then be incorporated as part of the detection data 360. The detection data 360 can be stored in a database, such as the database 310, described with reference to FIG. 3.

Finally, an object in the feature-based map can be identified as related to the input data set from the vehicular environment, at 612. After the comparison of the input features to the survey features, an object match can be determined from the objects of the feature-based map. In the case of an imperfect match, the object can be selected from the feature-based map based on the likelihood that the input features match the survey features. Once the object is selected, the method 600 can employ the feature-based map to present correlated information about the object to the detecting vehicle. The correlated information can include information from a variety of sensors, information from a variety of vehicles, information collected over a period of time, the input data set, publicly available information about the object or a type of object, or others to assist with one or more processes.

The identification of the object in the feature-based map can be performed as part of a system, such as the sensor-agnostic detection system 170, described with reference to FIG. 3. The sensor-agnostic detection system 170 can include the identification module 340. The identification module 340 can further include instructions to identify an object in the feature-based map as related to the input data set from the vehicular environment. The identification module 340 can determine an object related to the survey features based on the correlations of the input features. The correlated information 380, as associated with the object from the map information 370, can then be provided to the detecting vehicle. The correlated information 380 can be stored in a database, such as the database 310, described with reference to FIG. 3.

In an optional embodiment, method 600 can further include instructions to update or modify the feature-based map using the input features and the input data set. The input features and the input data set can include information regarding one or more parameters of the object that are not available from the survey data set. As such, the input features can be used to further describe the object when appropriate. The input features can be added to the feature-based map using points of overlap with the survey features. This will allow proper internal correlation between the input features and the survey features. In one embodiment, the input features can be added to the map to clarify previous additions to the map, as new input features may include a better view of preexisting data than either previously added input features or the survey features. Similarly, the input data set can be added to the correlated information for access after the determination of an object by another one or more detecting vehicles.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from an operator (e.g., a human user/driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from an operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the operator is to monitor the driving and be vigilant and ready to intervene with controlling the vehicle 100 if the autonomous driving module 160 fails to respond properly or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include geological and/or topographical features in relation to the map data 116. The terrain map(s) 117 can include the ground, terrain, roads, surfaces, and/or other landscape-based elements of the one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include map data 116 and/or sensor data 119. In this context, "map data" refers to any data providing relative proximity between two objects, usable by the vehicle 100, one or more systems of the vehicle 100, or the operator. "Sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LiDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the operator of the vehicle 100. However, it will be understood that the embodiments are not limited to the particular sensors described.

As an example, in one or more arrangements, the sensor system 120 can include one or more radar sensors 123, one or more LiDAR sensors 124, one or more sonar sensors 125, one or more cameras 126 and/or inertial measurement units (IMUs) 127. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator in order to determine a gaze of the operator, an eye tracking of the operator, and so on.

The vehicle 100 can include an input system 130. An "input system" includes any device, component, system, element or arrangement or groups thereof that enable information/data to be entered into a machine. The input system 130 can receive an input from a vehicle passenger (e.g., an operator or a passenger) or from external systems, such as from the sensor-agnostic detection system 170, described above with reference to FIG. 2. The vehicle 100 can include an output system 135. An "output system" includes any device, component, or arrangement or groups thereof that enable information/data to be transmitted to the vehicle or presented to a vehicle passenger (e.g., a person, a vehicle passenger, etc.). The output system 135 can be configured to communicate sensor data and other information to the sensor-agnostic detection system 170, as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the sensor-agnostic detection system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the sensor-agnostic detection system 170, and/or the autonomous driving module(s) 160 may control some or all of these vehicle systems 140 and, thus, may be partially or fully autonomous.

The processor(s) 110, the sensor-agnostic detection system 170, and/or the autonomous driving module(s) 160 can be operably connected to communicate with the various vehicle systems 140 and/or individual components thereof. For example, returning to FIG. 1, the processor(s) 110, the sensor-agnostic detection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the sensor-agnostic detection system 170, and/or the autonomous driving module(s) 160 may control some or all of these vehicle systems 140.

The processor(s) 110, the sensor-agnostic detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the sensor-agnostic detection system 170, and/or the autonomous driving module(s) 160 can control the direction and/or speed of the vehicle 100. The processor(s) 110, the sensor-agnostic detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the sensor-agnostic detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

The vehicle 100 can further include an augmented reality (AR) system 180. It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the sensor-agnostic detection system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods, and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer readable program code embodied or embedded, such as stored thereon. Any combination of one or more computer-readable media can be utilized. The computer-readable medium can be a computer readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. A sensor-agnostic detection system for object recognition in a vehicular environment, comprising:
   one or more processors; and
   a memory communicably coupled to the one or more processors and storing instructions that when executed by the one or more processors cause the one or more processors to:
   extract one or more survey features from a survey data set, the survey data set collected from a survey sensor type;
   map the one or more survey features to a feature-based map of a vehicular environment;
   collect an input data set using an input sensor type, the input sensor type being different from the survey sensor type;
   extract one or more input features from the input data set;
   correlate the one or more input features to the one or more survey features; and
   identify an object in the feature-based map as related to the input data set from the vehicular environment,
   at least one of the survey data set, the feature-based map, and the input data set being stored on at least one of: one or more data stores, one or more databases, and one or more servers.

2. The sensor-agnostic detection system of claim 1, wherein the memory stores further instructions that when executed by the one or more processors cause the one or more processors to:
   collect the survey data set from the vehicular environment using the survey sensor type.

3. The sensor-agnostic detection system of claim 1, wherein the input data set comprises data received from a plurality of sensors.

4. The sensor-agnostic detection system of claim 3, wherein the memory stores further instructions that when executed by the one or more processors cause the one or more processors to:
   extract the one or more input features from the input data set based on the input sensor type of each of the plurality of sensors.

5. The sensor-agnostic detection system of claim 1, wherein the one or more survey features comprise a high level description of one or more features of the object.

6. The sensor-agnostic detection system of claim 5, wherein the high level description includes model information and pose information.

7. The sensor-agnostic detection system of claim 1, wherein the memory stores further instructions that when executed by the one or more processors cause the one or more processors to:
   update the feature-based map using the one or more input features.

8. A non-transitory computer-readable medium for object recognition in a vehicular environment and storing instructions that when executed by one or more processors cause the one or more processors to:
   extract one or more survey features from a survey data set, the survey data set collected from a survey sensor type;
   map the one or more survey features to a feature-based map of a vehicular environment;
   collect an input data set using an input sensor type, the input sensor type being different from the survey sensor type;

extract one or more input features from the input data set;

correlate the one or more input features to the one or more survey features; and identify an object in the feature-based map as related to the input data set from the vehicular environment, at least one of the survey data set, the feature-based map, and the input data set being stored on at least one of: one or more data stores, one or more databases, and one or more servers.

9. The non-transitory computer-readable medium of claim 8, further comprising instructions to collect the survey data set from the vehicular environment using the survey sensor type.

10. The non-transitory computer-readable medium of claim 8, wherein the input data set comprises data received from a plurality of sensors.

11. The non-transitory computer-readable medium of claim 10, further comprising instructions to extract the one or more input features from the input data set based on a sensor data type.

12. The non-transitory computer-readable medium of claim 8, wherein the one or more survey features comprise a high level description of one or more features of the object.

13. The non-transitory computer-readable medium of claim 12, wherein the high level description includes model information and pose information.

14. The non-transitory computer-readable medium of claim 8, further comprising instructions to update the feature-based map using the one or more input features.

15. A method for object recognition in a vehicular environment, the method being performed using one or more processors, the method comprising:

extracting one or more survey features from a survey data set, the survey data set collected from a survey sensor type;

mapping the one or more survey features to a feature-based map of a vehicular environment;

collecting an input data set using an input sensor type, the input sensor type being different from the survey sensor type;

extracting one or more input features from the input data set;

correlating the one or more input features to the one or more survey features; and identifying an object in the feature-based map as related to the input data set from the vehicular environment;

at least one of the survey data set, the feature-based map, and the input data set being stored on at least one of: one or more data stores, one or more databases, and one or more servers.

16. The method of claim 15, further comprising collecting the survey data set from the vehicular environment using the survey sensor type.

17. The method of claim 15, wherein the input data set comprises data received from a plurality of sensors.

18. The method of claim 17, further comprising extracting the one or more input features from the input data set based on a sensor data type.

19. The method of claim 15, wherein the one or more survey features comprise a high level description of one or more features of the object.

20. The method of claim 19, wherein the high level description includes model information and pose information.

* * * * *